(12) United States Patent
Chen

(10) Patent No.: US 11,973,740 B2
(45) Date of Patent: Apr. 30, 2024

(54) SYSTEM AND METHOD FOR USE IN A QUANTUM-COMMUNICATION FIREWALL SOLUTION

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 214 days.

(21) Appl. No.: 17/837,066

(22) Filed: Jun. 10, 2022

(65) Prior Publication Data
US 2023/0403257 A1    Dec. 14, 2023

(51) Int. Cl.
*H04L 9/40*    (2022.01)
*H04B 10/70*    (2013.01)

(52) U.S. Cl.
CPC ......... *H04L 63/0245* (2013.01); *H04B 10/70* (2013.01); *H04L 63/1416* (2013.01)

(58) Field of Classification Search
CPC .. H04L 63/0245; H04L 63/1416; H04B 10/70
USPC .......................................................... 726/13
See application file for complete search history.

(56) References Cited

U.S. PATENT DOCUMENTS

| | | | | |
|---|---|---|---|---|
| 6,563,311 B2* | 5/2003 | Zagoskin | ............... | G06N 10/00 505/190 |
| 11,320,588 B1* | 5/2022 | Mazed | ............... | G16H 10/40 |
| 11,885,887 B1* | 1/2024 | Mazed | ............... | G01S 17/34 |
| 11,900,264 B2* | 2/2024 | McGeoch | ............... | G06N 10/00 |
| 2014/0291490 A1* | 10/2014 | Hanson | ............... | H01L 29/127 250/214 R |
| 2016/0161411 A1* | 6/2016 | Hudson | ............... | G01N 21/65 356/326 |
| 2017/0153435 A1* | 6/2017 | Alfano | ............... | G06N 10/00 |
| 2018/0254895 A1* | 9/2018 | Castinado | ............... | H04W 12/041 |
| 2020/0320543 A1* | 10/2020 | Carter | ............... | G06Q 10/0635 |
| 2020/0368491 A1* | 11/2020 | Poltorak | ............... | A61N 1/0456 |
| 2022/0196716 A1* | 6/2022 | Anderson | ............... | G01R 29/10 |
| 2022/0394478 A1* | 12/2022 | Chen | ............... | G06N 10/00 |
| 2023/0344201 A1* | 10/2023 | Warburton | ............... | H01S 5/041 |
| 2023/0403257 A1* | 12/2023 | Chen | ............... | H04B 10/70 |

OTHER PUBLICATIONS

Muneer Alshowkan; Advanced architectures for high-performance quantum networking; IEEE: May 2022; pp. 1-7.*

* cited by examiner

*Primary Examiner* — Monjur Rahim (57) ABSTRACT

A system with methods to be integrated as a quantum-communication firewall solution. The system is implemented with technology in combination of background-noise analysis, phase-shifting operation, phase-combination operations, and a proprietary data-synchronization mechanism. Thereby, through an optical communication channel with such a quantum-communication firewall solution, a conventional quantum communication system is not only capable of resisting specific spectrum attacks within a quantum communication channel, but also capable of countering a malicious optical source.

8 Claims, 7 Drawing Sheets

S1000 system (quantum-communication firewall)

FIG. 4

SYSTEM AND METHOD FOR USE IN A QUANTUM-COMMUNICATION FIREWALL SOLUTION

BACKGROUND OF THE INVENTION

1. Field of the Invention

The present invention relates to a quantum-communication firewall solution, and in particular, to a system or solutions with methods that detect background noises in a local environment for determining whether there is a suspect spectrum attack; and also provide a security data-synchronization tuning mechanism and a phase-shifting technology for an optical communication channel to protect conventional quantum transmissions.

2. Description of the Related Art

As the era of quantum communication has arrived, people need more creative methodologies to counter new cyber-attacks aimed at usual quantum transmissions, especially to the transmissions through optical channels. For the purpose of interfering with a quantum communication through optical channels, ways of spectrum attacks (such as using some radios with specific spectrums to generate critical noises for interfering with a native quantum transmission) are usually efficient and are difficult to defend against and countered. Most of the current firewall solutions against conventional cyber-attacks cannot work on cyber threats to these optical aspects.

Therefore, it is desirable to develop a firewall solution with a system and method to protect the conventional quantum transmissions through optical channels from specific spectrum attacks.

BRIEF SUMMARY OF THE INVENTION

In view of the drawbacks of the prior art, it is an object of the present invention to provide a firewall solution for the conventional quantum transmissions, wherein the solution includes a system and methods not only to detect a suspect spectrum attack, but also to enhance a data-synchronization tuning mechanism and to facilitate a phase-shifting technology; thereby protecting the native quantum transmissions and countering a suspect source.

To achieve the above objects and more, the present invention provides a solution as a quantum firewall solution to be integrated with an optical communication channel for conventional quantum transmissions. Wherein the solution (or a system) is implemented with the method comprising the following means: a) applying a plurality of emulated resonant cavities to emulate possible background noises by means of the following operations: emulating a standard local background environment for quantum transmission through an F-P cavity apparatus; emulating a local background environment with signal of quantum transmission getting worse through a large-radius-resonator apparatus; emulating a local background environment accompanied with decoherent photons from a quantum communication channel through a hemi-spherical-resonator apparatus; emulating a local background environment accompanied with a quantum communication channel which is impacted by a stress mechanics through a ring-resonator apparatus; emulating a local background environment with diffractive signals of quantum transmission through an open-cavity apparatus; and emulating a local background environment with scattered signals of quantum transmission through an external-cavity apparatus; thereby gathering a plurality of reference data to output sets of reference parameters for use in a monitor sub-system; b) implementing a monitor sub-system to determine whether there is a suspect spectrum attack on a quantum transmission by means of performing the following operations: 1) detecting distribution of AWGN (additive white Gaussian noise) in the local background environment; 2) expressing the detected distribution with a time-domain function to analyze its corresponding PSD (power spectral density) so as to derive zero crossing points through the time-domain function; 3) triggering a pink-noise generator to collaborate a Kronecker delta function for optimizing AWGN in the local background environment when the derived zero crossing points are more than a configured threshold in a specific time interval, so as to depress possible false-positive cases; 4) analyzing the pink noises in the time interval corresponding to the derived zero crossing points with the reference parameters derived from the emulated resonant cavities, so as to determine whether there is a suspect spectrum attack through a quantum communication channel; and 5) marking the detected AWGN distribution as an identified pattern after determining that there is a suspect spectrum attack through a quantum communication channel; thereby the monitor sub-system detecting a suspect quantum transmission and marking it for identification; and c) performing operations of phase switching after the monitor sub-system determined that there is a suspect spectrum attack within a quantum communication channel, thereby shifting user's phases to other phase positions where the native quantum transmissions will not be impacted by a suspect source; wherein the operations of phase switching include: performing phase switching through mechanism of self-phase modulation (SPM); performing phase switching through mechanism of cross-phase modulation (XPM); and performing phase switching through mechanism of four-wave mixing modulation (FWM). Thus, the effect of quantum firewall solution to protect the native quantum transmissions from suspect spectrum attacks is achieved.

It is to be noted that the following mentioned modules are equivalent to a set of software libraries or instructions formed with a plurality of compiled functions executed by a processor and can be re-accessed for performing a series of processes step by step. Moreover, the following mentioned generators and analyzers are equivalent to a set of loadable software libraries or compiled instructions with coded algorithm stored in a non-volatile memory to be executed by a micro control unit which can be driven by an active system.

In order to implement the above-mentioned method, the present invention provides an embodiment to be integrated with a quantum communication platform. This embodiment implements a first sub-system which comprises an F-P cavity emulation module, a large-radius-resonator emulation module, a hemi-spherical-resonator emulation module, a ring-resonator emulation module, an open-cavity emulation module, and an external-cavity emulation module; thereby utilizing sets of resonant cavities to emulate background noises of various local environments and characterizing the emulated results as reference patterns. Wherein, the F-P cavity emulation module collaborates with an F-P cavity apparatus to emulate a standard local background environment for conventional quantum transmissions; the large-radius-resonator emulation module collaborates with a large-radius-resonator apparatus to emulate a local background environment with signal of quantum transmission getting worse; the hemi-spherical-resonator emulation module collaborates with a hemi-spherical-resonator apparatus to emulate a local background environment accompanied with decoherent photons from a quantum communication channel; the ring-resonator emulation module collaborates with a ring-resonator apparatus to emulate a local background environment accompanied with a quantum communication channel which is impacted by a stress mechanics; the open-cavity emulation module collaborates with an open-cavity apparatus to emulate a local background environment with diffractive signals of conventional quantum transmissions; and the external-cavity emulation module collaborates with an external-cavity apparatus to emulate a local background environment with scattered signals of conventional quantum transmissions; thereby deriving corresponding resonant cavity related parameters, and then coupling to a plurality of phases to emulate possible background noises so as to derive a plurality of reference data based on the background-noise emulation.

Further, in the same embodiment, in order to determine whether there is a suspect spectrum attack on a quantum transmission, the system implements a second sub-system comprising: a zero-crossing analysis module, an AWGN optimization module, and a noise patterning module thereby monitoring background noises of the local environment meanwhile checking them with the reference data derived from the first sub-system. Wherein, the zero-crossing analysis module collaborates with an AWGN analyzer to detect a distribution of AWGN (additive white Gaussian noise) in the local background environment; the AWGN optimization module expresses the detected distribution with a time-domain function to analyze its corresponding PSD (power spectral density) so as to derive zero crossing points through the time-domain function first, and then collaborates with an pink-noise generator to work with a Kronecker delta function for optimizing AWGN in the local background environment when the derived zero crossing points are more than a configured threshold in a specific time interval, so as to depress possible false-positive cases; thereafter the noise patterning module collaborates with a pink-noise analyzer to analyze the pink noises in the time interval corresponding to the derived zero crossing points with the reference parameters derived from the emulated resonant cavities, so as to determine whether there is a suspect spectrum attack within a quantum communication channel, and then marks the detected AWGN distribution as an identified pattern after determining that there is a suspect spectrum attack within a quantum communication channel; thereby the second sub-system detecting a suspect quantum transmission and marking it for identification.

Thereafter, still in the same embodiment, in order to perform phase-switching operations implemented by a mechanism of phase modulations to avoid impacts on users' native quantum transmissions after the second-subsystem detected a suspect quantum transmission, the system provides a third sub-system which comprises: an SPM phase-switching module, an XPM phase-switching module, and an FWM phase-switching module. Wherein the SPM phase-switching module performs phase switching through a mechanism of self-phase modulation; the XPM phase-switching module performs phase switching through a mechanism of cross-phase modulation; and the FWM phase-switching module performs phase switching through a mechanism of four-wave mixing modulation. Thereby the system shifting user's phases to other phase positions such that the native quantum transmissions will not be impacted by a suspect source.

Moreover, in an embodiment, in order to counter a suspect source and facilitate protecting native quantum transmissions when the second sub-system keeps determining a suspect spectrum attack, the system further provides a fourth sub-system which comprises the following apparatuses: a set of optical shutters, a set of variable frequency rotating disc choppers, a set of spectroscopes, an optical meter, and a set of flip mirrors; thereby performing a series of phasing operations including: 1) analyzing wave-length related attributes used by the suspect source through a monochromatic wave equation; 2) estimating required phases from the analyzed result related to wave-length attributes so as to perform phase-matching operations; and 3) implementing required phases thereby protecting the native quantum transmission by means of phase reversal and countering the suspect source by means of phase matching.

Moreover, in the same embodiment, in order to facilitate estimating the required phases, the fourth sub-system further makes use of a monochromatic wave equation to analyze the relationship between wave vector and angular frequency so as to derive the required phases from the value of wave length. Further, after estimating the required phases, the fourth sub-system implements the required phases via performing operations of phase combination; wherein the operations of phase combination comprise the following steps: 1) preparing sets of high-speed shutters coupled to sets of rotating disc choppers with various frequencies to provide applicable initial spatial frequencies for the required phases; 2) preparing a set of spectroscopes to analyze specific composed wave lengths for a suspect quantum transmission and converting part of invisible spectrum to visible spectrum to facilitate phase-matching operation; 3) collaborating with an optical power meter to determine whether a beam is still applicable for quantum transmission after the beam passes through the spectroscopes; and 4) utilizing a set of flip mirrors onto the beams passing through the spectroscopes to facilitate phase-matching operation for countering the suspect source or to facilitate phase reversal for protecting the native quantum transmissions.

Moreover, in an embodiment, in order to resist an external interferential data transmission, the system further provides a fifth sub-system for performing operations of grating switching to implement a proprietary data-synchronization mechanism for a quantum communication. Wherein the fifth sub-system comprises a holographic grating module, an orthogonal grating module, a sinusoidal phase grating module, a plane-light-wave diffraction grating module, and an echelle grating module. Wherein, the holographic grating module collaborates a holographic grating to perform superposition principle of light-wave interferences thereby tuning data-synchronization frequency; the orthogonal grating module collaborates with an orthogonal grating to perform dot matrix transformation with a 2D optical scaler thereby tuning data-synchronization frequency; the sinusoidal phase grating module collaborates with a sinusoidal phase grating to perform operations of a sinusoidal function thereby tuning data-synchronization frequency; the plane-light-wave diffraction grating module collaborates with a plane-light-wave diffraction grating, especially a rectangular phase grating, to perform operations of reflections and interferences thereby tuning data-synchronization frequency; and the echelle grating module collaborates with an echelle grating, especially a large-area echelle grating, to perform operations of large diffraction spectral series thereby tuning data-synchronization frequency. Since the data-synchronization frequency for a quantum communication can be tuned dynamically in these ways, such data-synchronization mechanism will facilitate to assure that the communication system can receive the data of native quantum transmissions only, so as to achieve the effect of resisting an external interferential data transmission.

Further, in some embodiments, in order to enhance the proprietary data synchronization mechanism, the echelle grating module of the fifth sub-system supports more advanced tuning operations for data-synchronization frequency which is for use in a quantum communication through an optical channel by the following means: a) switching to a data-synchronization frequency which is implemented with a specific synchronization signal length within high resolution timing scales in high speed; b) switching to a data-synchronization frequency which is implemented with a long-length synchronization signal within high resolution timing scales; c) switching to a data-synchronization frequency which is implemented with a set of various synchronization signals continuously within high resolution timing scales; d) switching to a data-synchronization frequency implemented with a set of specific signal variations within high resolution timing scales; and e) switching to a data-synchronization frequency in accordance with a matrix configuration for performing dynamic tuning with various tuning operations. Thus, performing operations of large diffraction spectral series by the above-mentioned means will greatly enhance the data-synchronization mechanism for a quantum communication without receiving malicious data from an unknown source of quantum communication.

DETAILED DESCRIPTION OF THE INVENTION

To facilitate understanding of the objects, characteristics, dataflow and effects of this present disclosure, embodiments together with the attached drawings for the detailed description of the present disclosure are provided.

A plurality of embodiments in regard to a system and methods for use in a quantum-communication firewall solution are provided as follows. In some embodiments, this invention is implemented as a system of quantum communication platform with technology in the combination of background-noise analysis, phase-shifting operations, phase-combination operations, and a proprietary data-synchronization mechanism. Thereby, through an optical communication channel with a quantum-communication firewall solution composed of the above-mentioned technologies, a conventional quantum communication system will be capable of resisting specific spectrum attacks within a quantum communication channel.

Figure 1A:
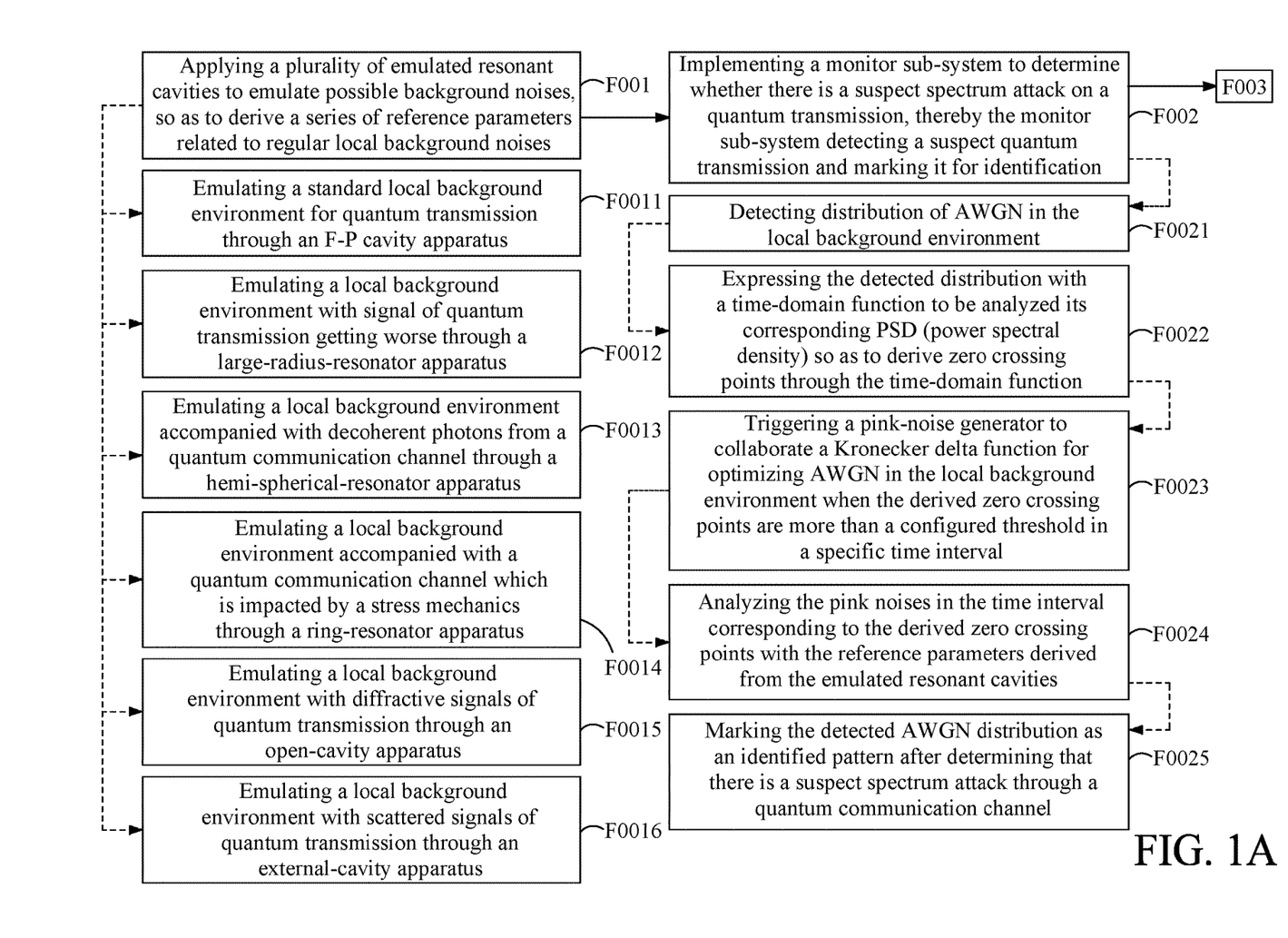
FIG. 1A is a dataflow diagram showing how the system of the present invention implements the method for use in a quantum communication firewall solution to achieve the object of protecting conventional quantum transmissions.
Figure 1B:
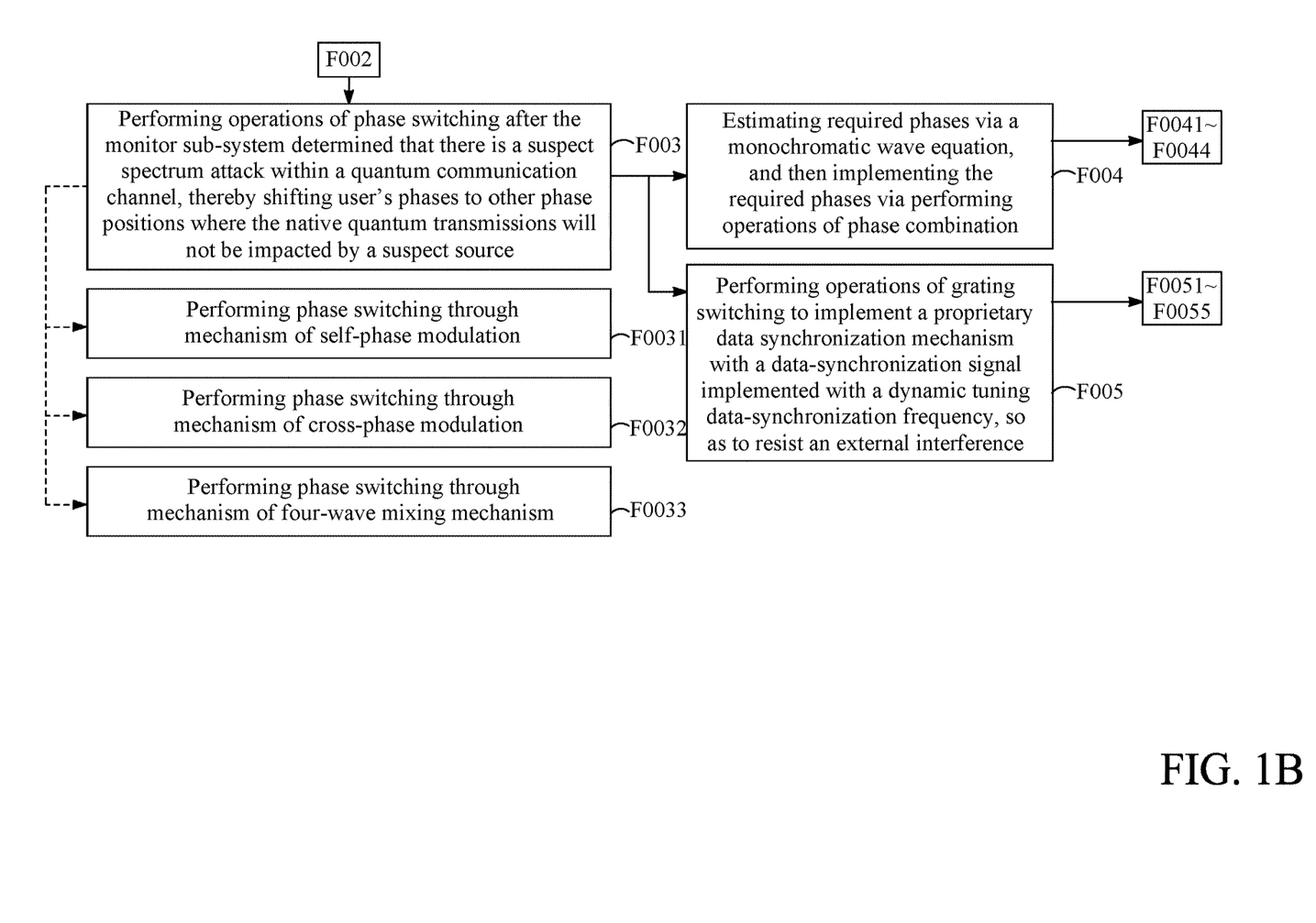
FIG. 1B is a dataflow diagram showing how the system of the present invention implements the method for use in a quantum communication firewall solution to achieve the object of protecting conventional quantum transmissions.

Referring to FIG. 1A and FIG. 1B, in some embodiments, this technology provides a solution as a quantum firewall solution to be integrated with an optical communication channel for conventional quantum transmissions. Wherein the solution (or a system) is implemented with the method comprising the following means: a) first, as shown in block F001, applying a plurality of emulated resonant cavities to emulate possible background noises by means of the following operations (as shown in blocks F0011~F0016): emulating a standard local background environment for quantum transmission through an F-P cavity apparatus; emulating a local background environment with a signal of quantum transmission getting worse through a large-radius-resonator apparatus; emulating a local background environment accompanied with decoherent photons from a quantum communication channel through a hemi-spherical-resonator apparatus; emulating a local background environment accompanied with a quantum communication channel which is impacted by a stress mechanics through a ring-resonator apparatus; emulating a local background environment with diffractive signals of quantum transmission through an open-cavity apparatus; and emulating a local background environment with scattered signals of quantum transmission through an external-cavity apparatus; thereby gathering a plurality of reference data to output sets of reference parameters for use in a monitor sub-system; b) thereafter, as shown in block F002, implementing a monitor sub-system to determine whether there is a suspect spectrum attack on a quantum transmission by means of performing the following operations: 1) first, as shown in block F0021, detecting distribution of AWGN (additive white Gaussian noise) in the local background environment (expressed as $Z_i \sim \mathcal{N}(0, N)$ and $Y_i = X_i + Z_i$, wherein $Y_i$ is AWGN channel output, $Z_i$ is the noise and is not correlated with $X_i$); 2) thereafter, as shown in block F0022, expressing the detected distribution with a time-domain function to analyze its corresponding PSD (power spectral density, in the form of $$P = \lim_{T \to \infty} \frac{1}{2T} \int_{-T}^{T} x(t)^2 dt)$$

so as to derive zero crossing points through the time-domain function; 3) thereafter, as shown in block F0023, triggering a pink-noise generator to collaborate with a Kronecker delta function (in the form of $\delta_{ij}=[i=j]$) for optimizing AWGN in the local background environment when the derived zero crossing points are more than a configured threshold in a specific time interval, so as to depress possible false-positive cases; 4) thereafter, as shown in block F0024, analyzing the pink noises in the time interval (corresponding PSD in the form of $$S(f) \propto \frac{1}{f^\alpha},$$

where f is frequency and α is closed to 1) corresponding to the derived zero crossing points with the reference parameters derived from the emulated resonant cavities, so as to determine whether there is a suspect spectrum attack through a quantum communication channel; and 5) in addition, as shown in block F0025, marking the detected AWGN distribution as an identified pattern after determining that there is a suspect spectrum attack through a quantum communication channel; thereby the monitor sub-system detecting a suspect quantum transmission and marking it for identification; and c) as shown in block F003, performing operations of phase switching after the monitor sub-system determined that there is a suspect spectrum attack within a quantum communication channel, thereby shifting user's phases to other phase positions where the native quantum transmissions will not be impacted by a suspect source; as shown in blocks F0031~F0033 of FIG. 1B, wherein the operations of phase switching include: performing phase switching through mechanism of self-phase modulation (SPM); performing phase switching through mechanism of cross-phase modulation (XPM); and performing phase switching through mechanism of four-wave mixing modulation (FWM). Thus, that will achieve the effect of quantum firewall solution to protect the native quantum transmissions from suspect spectrum attacks.

Figure 1C:
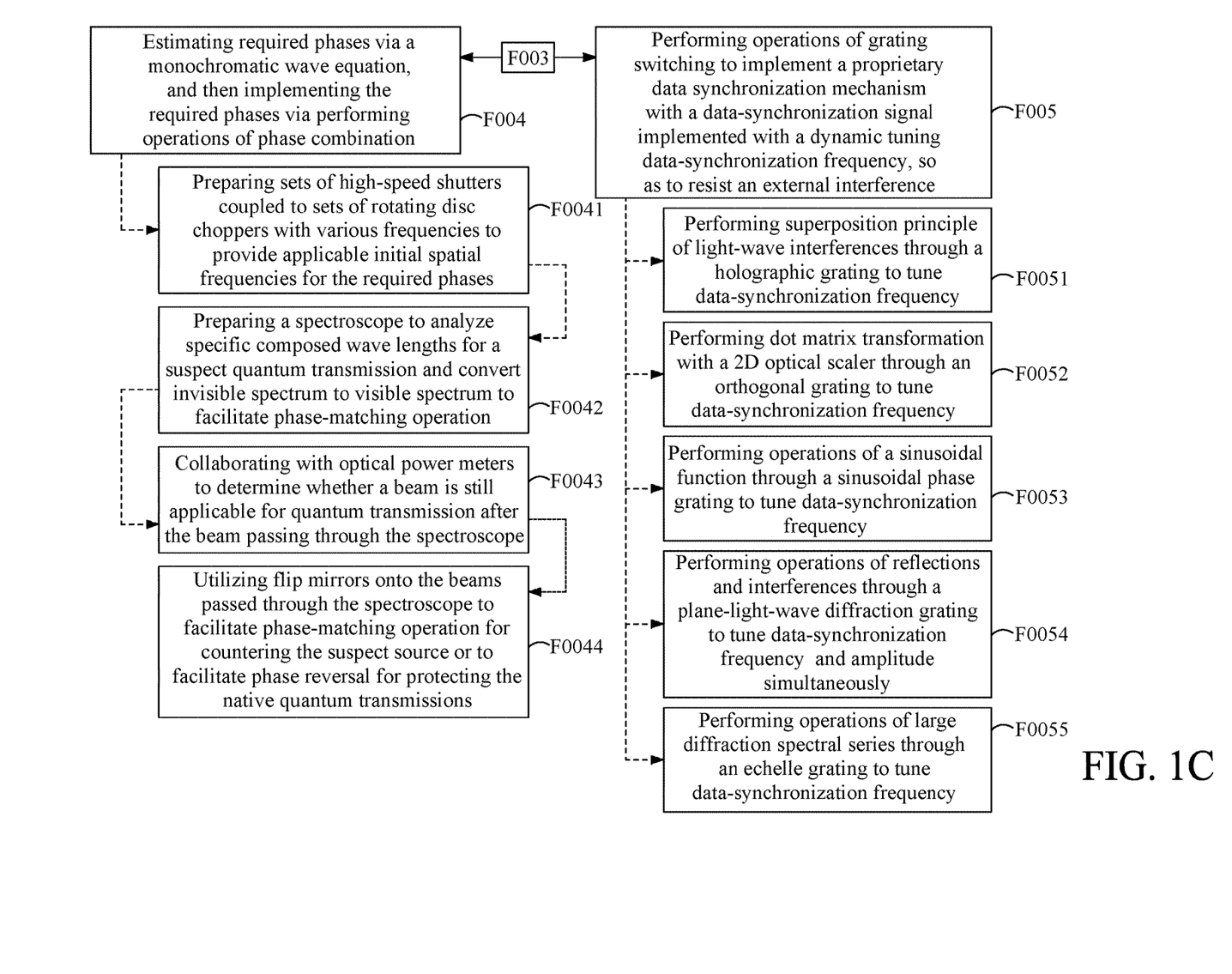
FIG. 1C is a dataflow diagram showing how the system of the present invention implements the method for use in a quantum communication firewall solution to achieve the object of protecting conventional quantum transmissions.
Figure 1D:
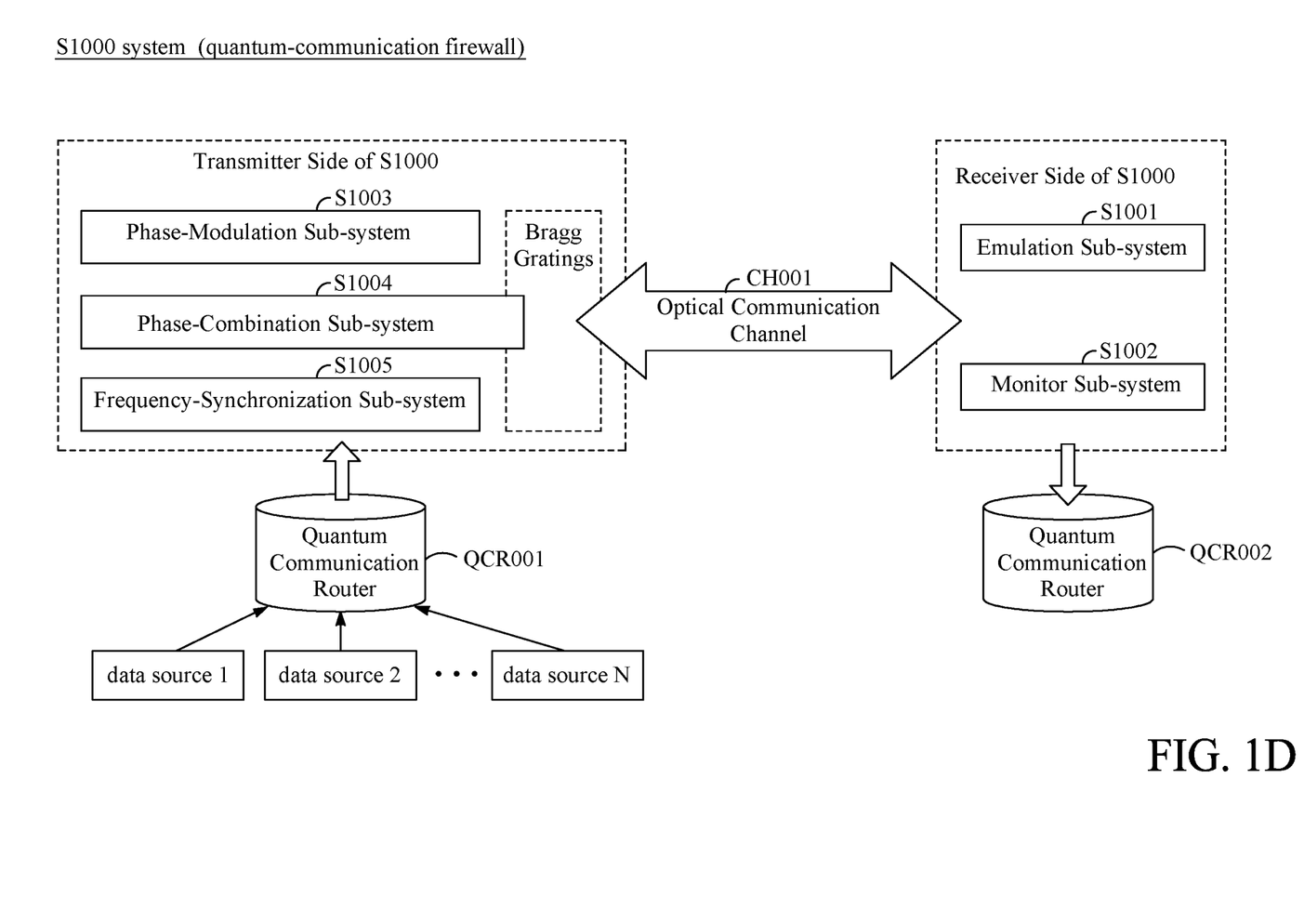
FIG. 1D is a structural block diagram of a user scenario to implement a quantum-communication firewall system.

Refer to FIG. 1D, which is a structural block diagram of a user scenario to implement a quantum-communication firewall system. In an embodiment of such user scenario, the present invention is implemented as a quantum-communication firewall system S1000 (firewall system thereafter); wherein the firewall system S1000 is capable of being integrated with router apparatuses (shown as QCR001 and QCR002 in FIG. 1D) for quantum communications through an optical communication channel CH001. In this embodiment, the firewall system S1000 can be implemented with different service packages to be installed on the transmitter side and the receiver side of a quantum communication system to apply the above-mentioned method for data sent out from a quantum-communication router QCR001 or for data which will be received by another quantum-communication router QCR002. A plurality of data sources (data source 1, data source 2, . . . data source N) provide data to the quantum-communication router QCR001.

Also referring to FIG. 1B, FIG. 1C, and FIG. 1D, in the same embodiment, the firewall system S1000 implements the following sub-systems such as: an emulation sub-system S1001 (shown in FIG. 1D) to apply F001 including F0011~F0016 (shown in FIG. 1A); a monitor sub-system S1002 (shown in FIG. 1D) to apply F002 including F0021~F0025 (shown in FIG. 1A); a phase-modulation sub-system S1003 (shown in FIG. 1D) to apply F003 including F0031~F0033 (shown in FIG. 1B); a phase-combination sub-system S1004 (shown in FIG. 1D) to apply F004 including F0041~F0044 (shown in FIG. 1C); and a frequency-synchronization sub-system S1005 (shown in FIG. 1D) to apply F005 including F0051~F0055 (shown in FIG. 1C).

Still referring to FIG. 1D, wherein the emulation sub-system S1001 and the monitor sub-system S1002 are computing units installed on a receiver side to emulate background noises in a local environment, and monitor the background noises for data streams being received by a quantum communication router QCR002 through an optical communication channel CH001; wherein the phase-modulation sub-system S1003, the phase-combination sub-system S1004, and the frequency-synchronization sub-system S1005 are computing units installed on a transmitter side coupling to sets of Bragg gratings to perform a transmission-protection mechanism of the firewall system S1000 for data streams transmitted by a quantum communication router QCR001 into the optical communication channel CH001. To a quantum communication system integrated with the quantum-communication firewall system S1000, the emulation sub-system S1001 and the monitor sub-system S1002 will facilitate analyzing the background noises on the receiver side and detects suspect spectrum attacks so as to trigger the transmission-protection mechanism installed on the transmitter side, wherein the transmission-protection mechanism is implemented by the phase-modulation sub-system S1003, the phase-combination sub-system S1004 and the frequency-synchronization sub-system S1005 for not only protecting native quantum transmissions but also countering a suspect source.

Figure 2:
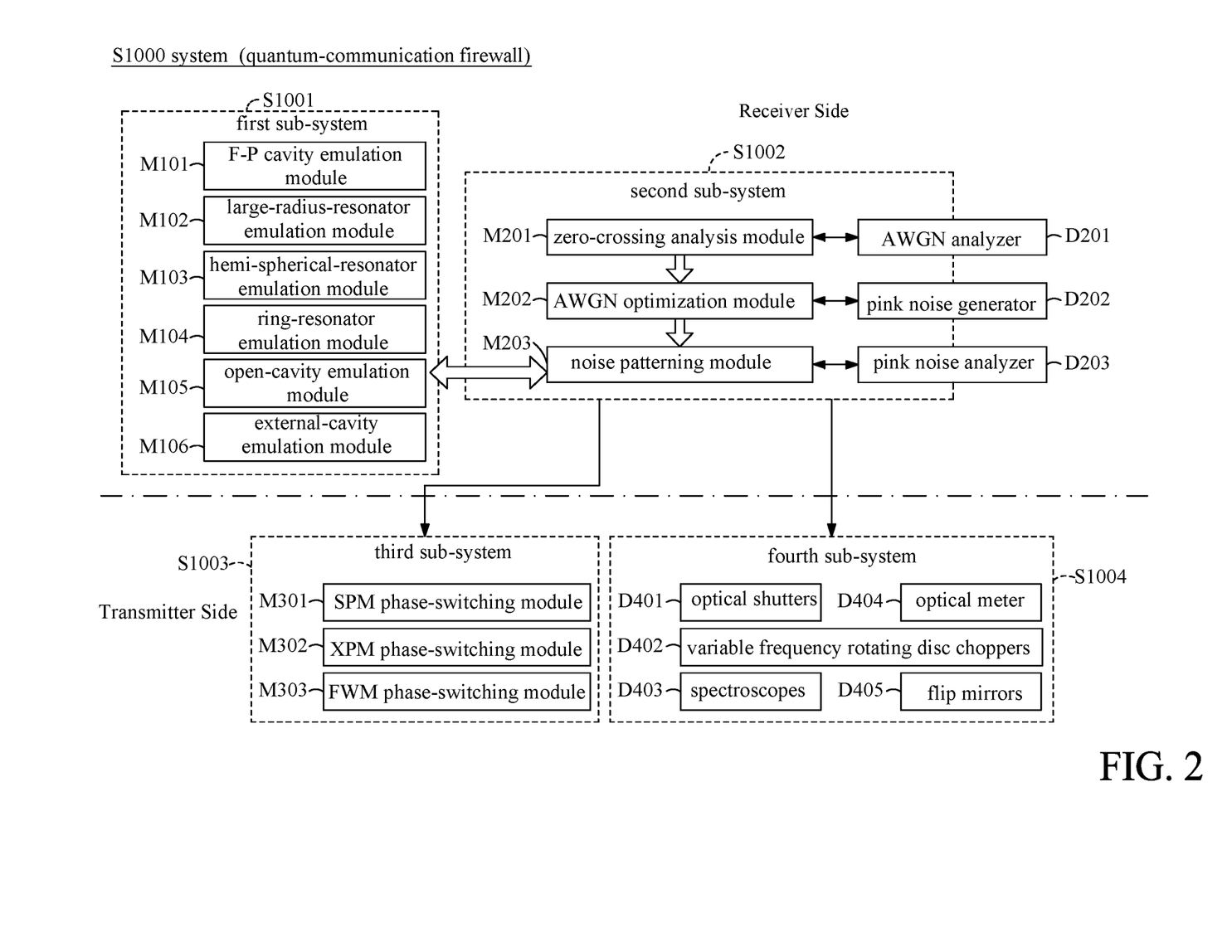
FIG. 2 is a structural block diagram of a system for use in a quantum communication firewall solution.

Refer to FIG. 2, which is a structural block diagram of a system for use in a quantum-communication firewall solution according to an embodiment of the present invention. In order to implement the above-mentioned user scenario shown in FIG. 1D, this disclosure provides an embodiment as a solution of a firewall system S1000 to be integrated with quantum communication routers (such as QCR001 and QCR002 shown in FIG. 1D). As shown in FIG. 2, this embodiment implements a first sub-system S1001 as an emulation sub-system on the receiver side for a quantum communication, wherein the first sub-system S1001 comprises an F-P cavity emulation module M101, a large-radius-resonator emulation module M102, a hemi-spherical-resonator emulation module M103, a ring-resonator emulation module M104, an open-cavity emulation module M105, and an external-cavity emulation module M106; thereby utilizing sets of resonant cavities to emulate background noises of various local environments and characterizing the emulated results as reference patterns for use in a monitor sub-system.

Wherein, the F-P cavity emulation module M101 collaborates with an F-P cavity apparatus (Fabry-Perot Cavity) to emulate a standard local background environment for conventional quantum transmissions that will produce reference data of PSD (power spectral density, in the form of $$P = \lim_{T \to \infty} \frac{1}{2T} \int_{-T}^{T} x(t)^2 dt)$$

derived with noises caused by diffraction loss; the large-radius-resonator emulation module M102 collaborates with a large-radius-resonator apparatus to emulate a local background environment with signal of quantum transmission getting worse that will produce reference data of PSD derived with thermal noises; the hemi-spherical-resonator emulation module M103 collaborates with a hemi-spherical-resonator apparatus to emulate a local background environment accompanied with decoherent photons from a quantum communication channel that will produce reference data of PSD derived with phase noises; the ring-resonator emulation module M104 collaborates with a ring-resonator apparatus to emulate a local background environment accompanied with a quantum communication channel which is impacted by a stress mechanics that will produce a reference data of PSD derived with backscattering induced noises; the open-cavity emulation module M105 collaborates with an open-cavity apparatus to emulate a local background environment with diffractive signals of conventional quantum transmissions that will produce a reference data of PSD derived with optical-flow induced noises; and the external-cavity emulation module M106 collaborates with an external-cavity apparatus to emulate a local background environment with scattered signals of conventional quantum transmissions that will produce a reference data of PSD derived with feedback-induced intensity noises; thereby deriving corresponding resonant cavity related parameters, and then coupling to a plurality of phases to emulate possible background noises so as to derive a plurality of reference data based on the background-noise emulation and making the reference data as patterns of the background noises.

Still referring to FIG. 2, further, in the same embodiment, in order to determine whether there is a suspect spectrum attack on a quantum transmission, the system of quantum-communication firewall S1000 implements a second sub-system S1002 as a monitor sub-system comprising: a zero-crossing analysis module M201, an AWGN optimization module M202, and a noise patterning module M203; thereby monitoring background noises of the local environment meanwhile checking them with the reference data derived from the first sub-system S1001. Wherein, the zero-crossing analysis module M201 collaborates with an AWGN analyzer D201 to detect a distribution of AWGN (additive white Gaussian noise) in the local background environment (such as $Z_i \sim \mathcal{N}(0, N)$ and $Y_i=X_i+Z_i$, wherein $Y_i$ is AWGN channel output, $Z_i$ is the noise and is not correlated with $X_i$) first; thereafter the AWGN optimization module M202 expresses the detected distribution with a time-domain function to analyze its corresponding PSD (power spectral density, in the form of $$P = \lim_{T \to \infty} \frac{1}{2T} \int_{-T}^{T} x(t)^2 dt$$

so as to derive zero crossing points through the time-domain function, and then collaborates with a pink-noise generator D202 to work with a Kronecker delta function (in the form of $\delta_{ij}=[i=j]$) for optimizing AWGN in the local background environment when the derived zero crossing points are more than a configured threshold in a specific time interval, so as to depress possible false-positive cases; thereafter the noise patterning module M203 collaborates with a pink-noise analyzer D203 to analyze the pink noises (its corresponding PSD is in the form of $$S(f) \propto \frac{1}{f^\alpha},$$

where f is frequency and α is closed to 1) with the reference parameters derived from the emulated resonant cavities driven by the first sub-system S1001, wherein the pink noises to be analyzed are in the time interval corresponding to the derived zero crossing points, so as to determine whether there is a suspect spectrum attack within a quantum communication channel, and then marks the detected AWGN distribution as an identified pattern after determining that there is a suspect spectrum attack within a quantum communication channel; thereby the second sub-system S1002 detecting a suspect quantum transmission and marking it for identification.

Still referring to FIG. 2, thereafter, in the same embodiment, in order to perform phase-switching operations implemented by a mechanism of phase modulations to avoid impacts on users' native quantum transmissions after the second sub-system S1002 detected a suspect quantum transmission, the system of quantum-communication firewall S1000 implements a third sub-system S1003 on the transmitter side, wherein the third sub-system S1003 comprises: an SPM phase-switching module M301, an XPM phase-switching module M302, and an FWM phase-switching module M303.

Wherein the SPM phase-switching module M301 performs phase switching through a mechanism of self-phase modulation (SPM) that makes use of an optical Kerr effect to cause a variation of reflection rate within an optical channel thereby generating phasing shift with pulses. Such mechanism with SPM not only facilitates to shift user's phases to other non-conflict positions, but also takes up more bandwidth to squeeze a suspect transmission.

Wherein the XPM phase-switching module M302 performs phase switching through a mechanism of cross-phase modulation (XPM) that makes use of an optical beam with specific wave length which is different from user's wave length thereby shifting user's phases occasionally meanwhile confusing a suspect receiver via padding additional messages.

Wherein the FWM phase-switching module M303 performs phase switching through a mechanism of four-wave mixing modulation (FWM) that makes use of a linear combination of 2 or 3 different wave lengths with phase-matching relationship, so as to support a mechanism to rotate a plurality of phases within an optical channel, thereby the quantum-communication firewall system S1000 shifting user's phases to other phase positions based on the above modulation mechanisms such that the native quantum transmissions will not be impacted by a suspect source.

Still referring to FIG. 2, moreover, in an embodiment, in order to counter a suspect source and facilitate to protect native quantum transmissions when the second sub-system S1002 keeps determining a suspect spectrum attack, the system of quantum-communication firewall S1000 further implements a fourth sub-system S1004 as a phase-combination sub-system on the transmitter side, wherein the fourth sub-system comprises the following apparatuses: a set of optical shutters D401, a set of variable frequency rotating disc choppers D402, a set of spectroscopes D403, an optical meter D404, and a set of flip mirrors D405; thereby performing a series of phasing operations including: 1) analyzing wave-length related attributes used by the suspect source through a monochromatic wave equation; 2) estimating required phases from the analyzed result related to wave-length attributes so as to perform phase-matching operations; and 3) implementing required phases thereby protecting the native quantum transmission by means of phase reversal and countering the suspect source by means of phase matching.

Still referring to FIG. 2, in the same embodiment, in order to facilitate estimating the required phases, the fourth sub-system S1004 further makes use of a monochromatic wave equation to analyze the relationship between wave vector and angular frequency so as to derive the required phases from the value of wave length. For example, according to the equation for traveling waves $\psi(r,t)=A\cos(k \cdot r - \omega t + \varphi_0)$ where ω is angular frequency and A is amplitude, the wave vector will be $k=|k|=\omega/C=2\pi/\lambda$ where λ is wave length, thereby estimating the required phases. Further, also referring to FIG. 1C, as shown in block F004, after estimating the required phases, the fourth sub-system S1004 implements the required phases via performing operations of phase combination (as shown in blocks F0041~F0044); wherein the operations of phase combination comprise the following steps: 1) as shown in block F0041, preparing sets of high-speed shutters coupled to sets of rotating disc choppers with various frequencies to provide applicable initial spatial frequencies for the required phases, wherein the initial spatial frequency is tuned by the angular frequency with changes of rotating periods; 2) as shown in block F0042, preparing a set of spectroscopes to analyze specific composed wave lengths for a suspect quantum transmission and converting part of invisible spectrum to visible spectrum to facilitate phase-matching operation; 3) as shown in block F0043, collaborating with an optical power meter to determine whether a beam is still applicable for quantum transmission after the beam passing through the spectroscopes; and 4) as shown at block F0044, utilizing a set of flip mirrors onto the beams passing through the spectroscopes to implement basic phases to facilitate phase-matching operation for countering the suspect source or to facilitate phase reversal for protecting the native quantum transmissions.

In an embodiment, referring to FIG. 1D with FIG. 1C, the fourth sub-system S1004 acquires basic phases after performing the operations as shown in blocks F0041~F0044 thereby the fourth sub-system S1004 leveraging optical Kerr effects enhanced by sets of Bragg gratings on the transmitter side (as shown in FIG. 1D) so as to induce phase shifts to facilitate phase-matching or phase reversal operations meanwhile conducting a corresponding traveling wave into the optical communication channel.

Figure 3:
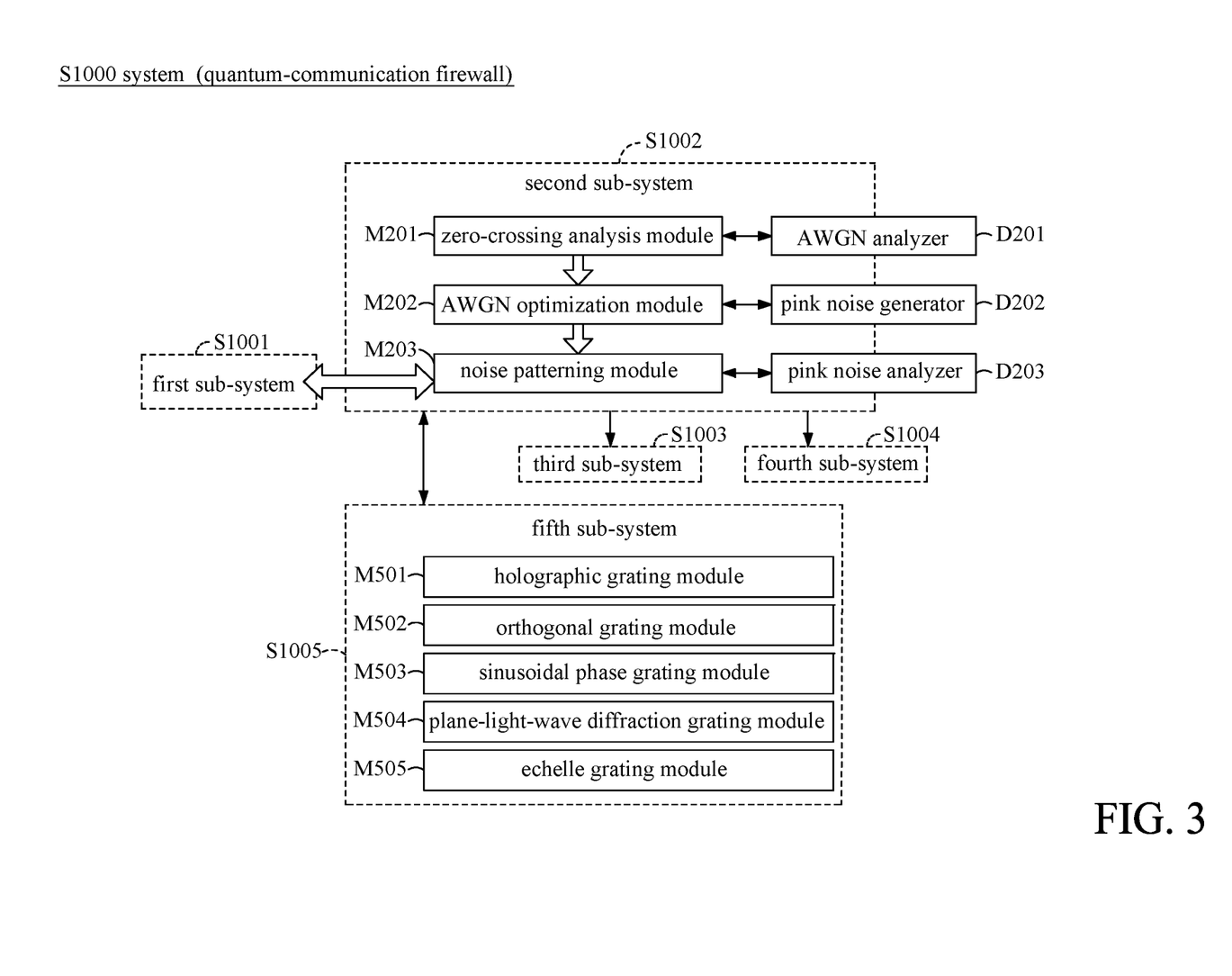
FIG. 3 is a structural block diagram of a system for use in a quantum communication firewall solution.

Moreover, referring to FIG. 3 and FIG. 1C, in an embodiment, in order to resist an external interferential data transmission, the system of quantum communication platform S1000 further implements a fifth sub-system S1005 as a frequency-synchronization sub-system for performing operations of grating switching (as shown at blocks F0051~F0055 in FIG. 1C) to perform a proprietary data-synchronization mechanism for a quantum communication. Wherein the fifth sub-system S1005 comprises a holographic grating module M501, an orthogonal grating module M502, a sinusoidal phase grating module M503, a plane-light-wave diffraction grating module M504, and an echelle grating module M505. Wherein, the holographic grating module M501 collaborates with a holographic grating to perform superposition principle of light-wave interferences thereby tuning data-synchronization frequency; the orthogonal grating module M502 collaborates with an orthogonal grating to perform dot matrix transformation with a 2D optical scaler thereby tuning data-synchronization frequency; the sinusoidal phase grating module M503 collaborates with a sinusoidal phase grating to perform operations of a sinusoidal function thereby tuning data-synchronization frequency; the plane-light-wave diffraction grating module M504 collaborates with a plane-light-wave diffraction grating, especially a rectangular phase grating, to perform operations of reflections and interferences thereby tuning data-synchronization frequency; and the echelle grating module M505 collaborates with an echelle grating, especially a large-area echelle grating, to perform operations of large diffraction spectral series thereby tuning data-synchronization frequency. Since the data-synchronization frequency for a quantum communication can be tuned dynamically in these ways, such data-synchronization mechanism will facilitate ensuring that a communication system can receive the data of native quantum transmissions only, so as to achieve the effect of resisting an external interferential data transmission.

Figure 4:
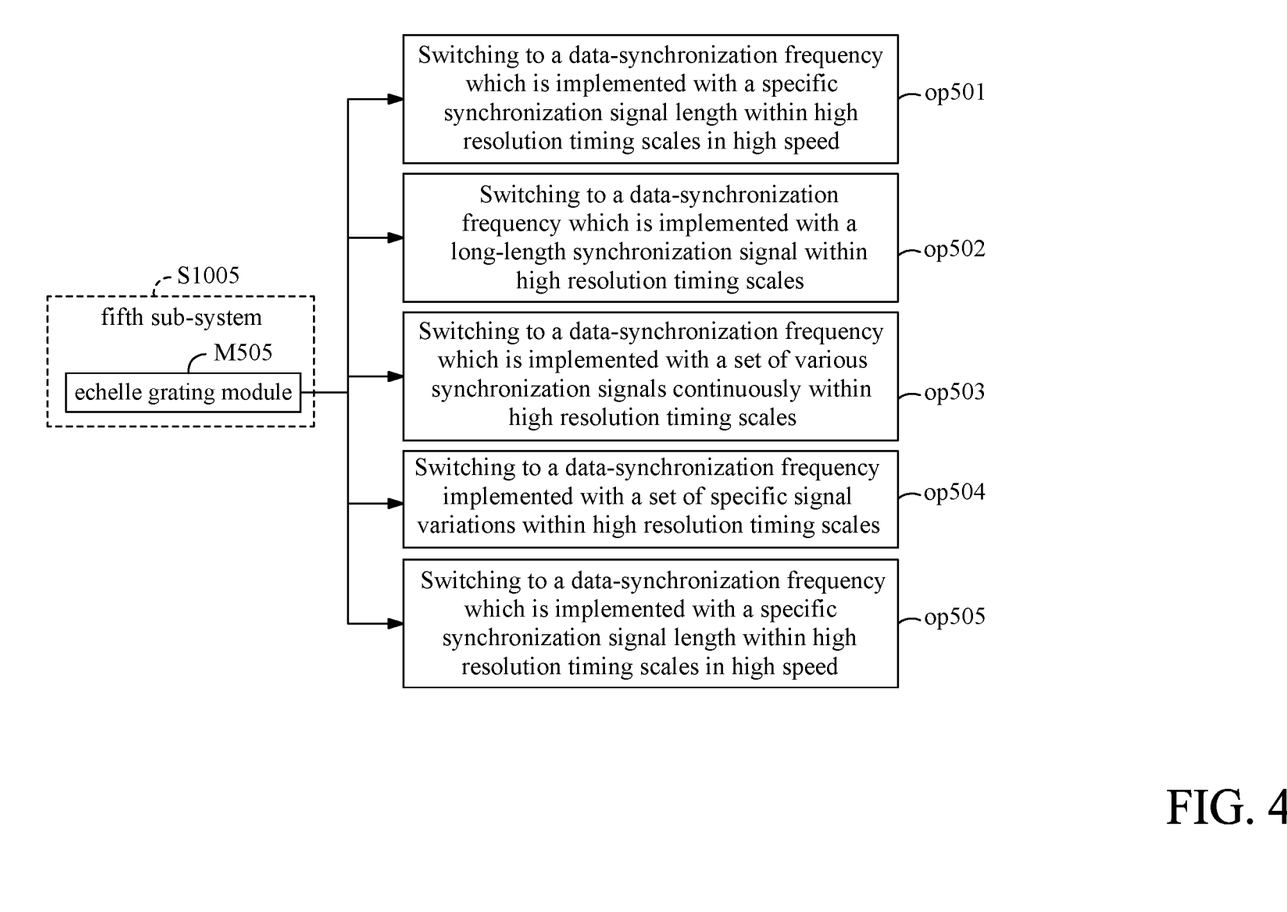
FIG. 4 is a dataflow diagram showing how the echelle grating module of the fifth sub-system implements the tuning operations to enhance the data-synchronization mechanism.

Further, referring to FIG. 4, in some embodiments, in order to enhance the proprietary data synchronization mechanism, the echelle grating module M505 of the fifth sub-system S1005 supports more advanced tuning operations (as shown in blocks op501~op505) for data-synchronization frequency which is for use in a quantum communication through an optical communication channel by the following means: a) as shown in block op501, switching to a data-synchronization frequency which is implemented with a specific synchronization signal length within high resolution timing scales in high speed; b) as shown in block op502, switching to a data-synchronization frequency which is implemented with a long-length synchronization signal within high resolution timing scales; c) as shown in block op503, switching to a data-synchronization frequency which is implemented with a set of various synchronization signals continuously within high resolution timing scales; d) as shown in block op504, switching to a data-synchronization frequency implemented with a set of specific signal variations within high resolution timing scales; and e) as shown in block op505, switching to a data-synchronization frequency in accordance with a matrix configuration for performing dynamic tuning with various tuning operations. Thus, performing operations of large diffraction spectral series by the above-mentioned means will greatly enhance the data-synchronization mechanism for a quantum communication without receiving malicious data from an unknown source of quantum communication.

While the present disclosure has been described by means of specific embodiments, numerous modifications and variations could be made thereto by those skilled in the art without departing from the scope and spirit of the present disclosure set forth in the claims.

What is claimed is:
1. A quantum communication firewall system, the quantum communication firewall system comprising:
   a) a first sub-system comprising:
      an F-P cavity device;
      a large-radius-resonator device;
      a hemi-spherical-resonator device;
      a ring-resonator device;
      an open-cavity device; and
      an external-cavity device;
   wherein the first sub-system derives corresponding resonant cavity related parameters, thereby coupling to a plurality of phases to emulate possible background noises so as to derive a plurality of reference data and making the plurality of reference data as patterns of the background noises;
   b) a second sub-system comprising:
      an additive white Gaussian noise (AWGN) analyzer;
      a pink-noise generator; and
      a pink-noise analyzer;
   wherein the second sub-system monitors background noises of a local environment meanwhile comparing the background noises with the reference data derived from the first sub-system, so as to determine whether there is a suspect quantum transmission and obtain a pattern related to a distribution of AWGN of the suspect quantum transmission; and
   c) a third sub-system performing phase-switching operations implemented by a mechanism of phase modulations comprising:
      Self Phase Modulation (SPM);
      Cross Phase Modulation (XPM); and
      Four Wave Mixing (FWM);
   wherein after the second sub-system determined that there is a suspect quantum transmission, the user's phases being shifted to avoid impacts on users' native quantum transmissions;
   wherein the system supports a firewall system to resist spectrum attacks on a quantum communication channel.

2. The quantum communication firewall system according to claim 1, wherein in order to counter a suspect source and protect native quantum transmission, the quantum communication firewall system further provides a fourth sub-system embedded with a set of apparatuses for performing a series of phasing operations, wherein the set of apparatuses comprises:
- a set of optical shutters;
- a set of variable frequency rotating disc choppers;
- a set of spectroscopes;
- an optical meter; and
- a set of flip mirrors;
- wherein the phasing operations performed by the fourth sub-system include:
- analyzing wave-length related attributes used by the suspect source through a monochromatic wave equation;
- estimating required phases from the analyzed result related to wave-length attributes so as to perform phase matching operations; and
- implementing required phases thereby protecting the native quantum transmission with phase reversal and countering the suspect source with phase matching.

3. The quantum communication firewall system according to claim 1, wherein in order to resist an external interferential data transmission, the quantum communication firewall system further provides a fifth sub-system for performing operations of grating switching to implement a proprietary data synchronization mechanism; wherein the fifth sub-system comprises:
- a holographic grating module performing superposition principle of light-wave interferences to tune data-synchronization frequency;
- an orthogonal grating module performing dot matrix transformation with a 2D optical scaler to tune data-synchronization frequency;
- a sinusoidal phase grating module performing operations of a sinusoidal function to tune data-synchronization frequency;
- a plane-light-wave diffraction grating module which collaborates with a rectangular phase grating to perform operations of reflections and interferences to tune data-synchronization frequency and amplitude simultaneously; and
- an echelle grating module which collaborates with a large-area echelle grating to perform operations of large diffraction spectral series to tune data-synchronization frequency;
- wherein generating a data synchronization signal with a specific synchronizing frequency for a quantum transmission through an optical channel the specific synchronizing frequency is capable of being tuned dynamically with a matrix configuration.

4. A method for use in a quantum communication firewall system, the method comprising:
a) applying a plurality of emulated resonant cavities to emulate possible background noises by means of the following operations:
- emulating a standard local background environment for quantum transmission through an F-P cavity apparatus;
- emulating a local background environment with signal of quantum transmission getting worse through a large-radius-resonator apparatus;
- emulating a local background environment accompanied with decoherent photons from a quantum communication channel through a hemi-spherical-resonator apparatus;
- emulating a local background environment accompanied with a quantum communication channel which is impacted by a stress mechanics through a ring-resonator apparatus;
- emulating a local background environment with diffractive signals of quantum transmission through an open-cavity apparatus; and
- emulating a local background environment with scattered signals of quantum transmission through an external-cavity apparatus;
so as to derive a series of reference parameters related to regular local background noises;
b) implementing a monitor sub-system to determine whether there is a suspect spectrum attack on a quantum transmission by means of performing the following operations:
- detecting distribution of additive white Gaussian noise (AWGN) in a local background environment;
- expressing the detected distribution with a time-domain function to be analyzed its corresponding power spectral density (PSD), in form of $$P = \lim_{T \to \infty} \frac{1}{2T} \int_{-T}^{T} x(t)^2 dt$$

so as to derive zero crossing points through the time-domain function;
- triggering a pink-noise generator to collaborate a Kronecker delta function for optimizing AWGN in the local background environment when the derived zero crossing points are more than a configured threshold in a specific time interval, so as to depress possible false-positive cases;
- analyzing the pink noises (corresponding PSD in form of $$S(f) \propto \frac{1}{f^\alpha},$$

where f is frequency and $\alpha$ is closed to 1) in the time interval corresponding to the derived zero crossing points with the reference parameters derived from the emulated resonant cavities, so as to determine whether there is a suspect spectrum attack through a quantum communication channel; and
- marking the detected AWGN distribution as an identified pattern after determining that there is a suspect spectrum attack through a quantum communication channel;
thereby the monitor sub-system detecting a suspect quantum transmission and marking it for identification; and
c) performing operations of phase switching after the monitor sub-system determined that there is a suspect spectrum attack within a quantum communication channel, thereby shifting user's phases to other phase positions where the native quantum transmissions will not be impacted by a suspect source; wherein the operations of phase switching include:
- performing phase switching through a mechanism of self-phase modulation;
- performing phase switching through a mechanism of cross-phase modulation; and
- performing phase switching through a mechanism of four-wave mixing modulation.

5. The method for use in a quantum communication firewall system according to claim 4, wherein in order to counter a suspect source and protect native quantum transmissions when the monitor sub-system keeps determining a suspect spectrum attack, the method further comprises the following operations:
   a) deriving required phases via a monochromatic wave equation with wave vector and angular frequency wherein the wave vector is derived from $2\pi/\lambda$ where $\lambda$ is wave length;
   b) implementing required phases via performing operations of phase combination; wherein the operations of phase combination comprise the following steps:
      1) preparing sets of high-speed shutters coupled to sets of rotating disc choppers with various frequencies to provide applicable initial spatial frequencies for the required phases;
      2) preparing a set of spectroscopes to analyze specific composed wave lengths for a suspect quantum transmission and converting part of invisible spectrum to visible spectrum to facilitate phase-matching operation;
      3) collaborating with an optical power meter to determine whether a beam is still applicable for quantum transmission after the beam passing through the spectroscope; and
      4) utilizing a set of flip mirrors onto the beams passing through the spectroscopes to facilitate phase-matching operation for countering the suspect source or to facilitate phase reversal for protecting the native quantum transmissions.

6. The method for use in a quantum communication firewall system according to claim 4, wherein in order to resist an external interference, the method further performs operations of grating switching to implement a proprietary data synchronization mechanism with a data-synchronization signal implemented with a dynamic tuning data-synchronization frequency; wherein the operations of grating switching comprise:
   a) performing superposition principle of light-wave interferences through a holographic grating to tune data-synchronization frequency;
   b) performing dot matrix transformation with a 2D optical scaler through an orthogonal grating to tune data-synchronization frequency;
   c) performing operations of a sinusoidal function through a sinusoidal phase grating to tune data-synchronization frequency;
   d) performing operations of reflections and interferences through a plane-light-wave diffraction grating to tune data-synchronization frequency and amplitude simultaneously; and
   e) performing operations of large diffraction spectral series through a large-area echelle grating to tune data-synchronization frequency.

7. The method for use in a quantum communication firewall system according to claim 6, in order to enhance the proprietary data synchronization mechanism, by means of performing operations of large diffraction spectral series through an echelle grating, the method further provides the following available tuning operations for data-synchronization frequency which is for use in a quantum communication through an optical channel:
   a) switching to a data-synchronization frequency which is implemented with a specific synchronization signal length within high resolution timing scales in high speed;
   b) switching to a data-synchronization frequency which is implemented with a long-length synchronization signal within high resolution timing scales;
   c) switching to a data-synchronization frequency which is implemented with a set of various synchronization signals continuously within high resolution timing scales;
   d) switching to a data-synchronization frequency implemented with a set of specific signal variations within high resolution timing scales; and
   e) switching to a data-synchronization frequency in accordance with a matrix configuration for performing dynamic tuning with various tuning operations.

8. A quantum communication firewall system, the quantum communication firewall system comprising:
   a) a first sub-system comprising:
      an F-P cavity emulation module for emulating a standard local background environment for quantum transmission;
      a large-radius-resonator emulation module for emulating a local background environment with signal of quantum transmission getting worse;
      a hemi-spherical-resonator emulation module for emulating a local background environment accompanied with decoherent photons from a quantum communication channel;
      a ring-resonator emulation module for emulating a local background environment accompanied with a quantum communication channel which is impacted by a stress mechanics;
      an open-cavity emulation module for emulating a local background environment with diffractive signals of quantum transmission; and
      an external-cavity emulation module for emulating a local background environment with scattered signals of quantum transmission;
      wherein the first sub-system derives corresponding resonant cavity related parameters, thereby coupling to a plurality of phases to emulate possible background noises so as to derive a plurality of reference data and making the plurality of reference data as patterns of the background noises;
   b) a second sub-system comprising:
      an additive white Gaussian noise (AWGN) analyzer for detecting a distribution of AWGN in the local background environment;
      a pink-noise generator for optimizing AWGN in the local background environment when derived zero crossing points are more than a configured threshold in a specific time interval, so as to depress possible false-positive cases; and
      a pink-noise analyzer for analyzing pink noises in the time interval corresponding to the derived zero crossing points with the reference parameters derived from the emulated resonant cavities, so as to determine whether there is a suspect spectrum attack within a quantum communication channel, and then marking the detected AWGN distribution as an identified pattern after determining that there is a suspect spectrum attack within a quantum communication channel;
      wherein the second sub-system monitors background noises of a local environment meanwhile comparing the background noises with the reference data derived from the first sub-system, so as to determine whether there is a suspect quantum transmission and obtain a pattern related to a distribution of AWGN of the suspect quantum transmission; and
c) a third sub-system performing phase-switching operations implemented by a mechanism of phase modulations comprising:
a Self-Phase Modulation (SPM) module for performing phase switching through a mechanism of self-phase modulation;
a Cross-Phase Modulation (XPM) module for performing phase switching through a mechanism of cross-phase modulation; and
a Four-Wave Mixing (FWM) module for performing phase switching through a mechanism of four-wave mixing modulation;
wherein after the second sub-system determined that there is a suspect quantum transmission, the user's phases being shifted to avoid impacts on users' native quantum transmissions; and
wherein the system supports a firewall system to resist spectrum attacks on a quantum communication channel.

\* \* \* \* \*